United States Patent [19]

Hartmann et al.

[11] Patent Number: 5,275,475
[45] Date of Patent: Jan. 4, 1994

[54] METHOD FOR CONTROLLING VEHICLE DYNAMICS

[75] Inventors: Uwe Hartmann, Stuttgart; Thomas Ehret, Schwieberdingen; Anton Van Zanten, Ditzingen; Friedrich Kost, Kornwestheim, all of Fed. Rep. of Germany

[73] Assignee: Robert Bosch GmbH, Stuttgart, Fed. Rep. of Germany

[21] Appl. No.: 847,107

[22] PCT Filed: Aug. 8, 1991

[86] PCT No.: PCT/EP91/01499
§ 371 Date: Apr. 13, 1992
§ 102(e) Date: Apr. 13, 1992

[87] PCT Pub. No.: WO92/03314
PCT Pub. Date: Mar. 5, 1992

[30] Foreign Application Priority Data

Aug. 23, 1990 [DE] Fed. Rep. of Germany ....... 4026626

[51] Int. Cl.$^5$ ................................................ B60T 8/24
[52] U.S. Cl. ...................................... 303/103; 303/113.4; 364/426.02
[58] Field of Search ............... 303/100, 103, 110, 111, 303/113.4, 24.1; 364/426.01-

[56] References Cited

U.S. PATENT DOCUMENTS

| 4,758,053 | 7/1988 | Yasuno .................... 303/100 X |
| 4,779,202 | 10/1988 | Leiber .................... 303/100 X |
| 4,794,539 | 12/1988 | Wallentowitz et al. ......... 303/100 X |
| 4,898,431 | 2/1990 | Karnopp et al. ............ 303/100 |
| 4,902,076 | 2/1990 | Ushijima et al. ............ 303/103 X |
| 4,998,593 | 3/1991 | Karnopp et al. ............ 364/426.02 X |
| 5,051,908 | 9/1991 | Shiraishi .................. 364/426.02 |

FOREIGN PATENT DOCUMENTS

| 3611822 | 10/1986 | Fed. Rep. of Germany . |
| 3919347 | 2/1990 | Fed. Rep. of Germany . |
| 8902842 | 4/1989 | World Int. Prop. O. . |

Primary Examiner—Robert J. Oberleitner
Assistant Examiner—Alfred Muratori
Attorney, Agent, or Firm—Michael J. Striker

[57] ABSTRACT

Using a model calculation, desired changes in the yaw rate $\Delta\dot{\phi}$ and the transverse acceleration $\Delta\ddot{y}$ are determined from a small change actually made in the steering angle and are compared to measured quantities $\Delta\dot{\phi}_F$ and $\Delta\ddot{y}_F$ determined on the vehicle. The deviations of the actual values of yaw rate and transverse acceleration from the calculated values are weighted using predetermined weighting factors for the relative importance of yaw rate and transverse acceleration and supplied with factors dependent on the individual wheel; finally, the values relating to the same wheel are added. They represent desired changes in the brake slip values and a controller finally converts these into brake slip value changes.

4 Claims, 2 Drawing Sheets

METHOD FOR CONTROLLING VEHICLE DYNAMICS

BACKGROUND OF THE INVENTION

As is known, vehicle dynamics are influenced by the forces exerted on the tires of the vehicle by the roadway. It is known that, when the vehicle is braking, the skew running stiffness of the tires depends on the brake slips of the tires. In general, the skew running stiffness of the tires decreases with increasing brake slip.

For guiding the vehicle, cornering forces on the tires are necessary. For the yawing dynamics of the vehicle, yawing moments on the vehicle are necessary. These yawing moments can be caused both by the braking forces and by the cornering forces. For the yawing movement of the vehicle, the braking forces are thus important for two reasons. Firstly because the braking forces can exert a yawing moment on the vehicle and secondly because the braking forces can influence the yawing moment of the cornering forces (indirectly via the brake slip) by changing the skew running stiffness.

SUMMARY OF THE INVENTION

It is an object of the present invention to provide a method of controlling vehicle dynamics.

The driving dynamics are thus influenced by means of brake intervention. The driving dynamics are optimized during a braking operation yet the braking distance is also minimised.

For this purpose, it is necessary to seek a compromise in which the brake slip values at the tires are set in such a way that, on the one hand, the yawing dynamics are improved without, on the other hand, wasting too much braking retardation. For this purpose, it is determined at each tire how, on the one hand, the yawing moment on the vehicle changes and how, on the other hand, the braking retardation of the vehicle changes when there is a small change in the brake slip. The ratio of the change in the yawing moment to the change in the braking retardation is calculated for each wheel. For control of the yawing moment, the wheel with the largest ratio is used most and the wheel with the smallest ratio is used least. This settles the central question of how the distribution of the braking forces or the distribution of the brake slips is to be configured.

The change in the braking and cornering forces due to changes in the brake slips can either be measured directly or estimated by suitable estimating algorithms.

For the determination of the necessary brake slip changes at the wheels, a control deviation is required. A model-based follow-up control is chosen for this purpose. Since, however, the position of the vehicle cannot immediately be measured, only the transitional behavior of the vehicle transverse acceleration and vehicle yawing speed is simulated. The damping of the systems is to be critical since this is considered the best dynamic behavior by most drivers.

For the following description, the notation given in FIG. 1 and on page 9 applies.

The model is described as follows:

$$\overset{...}{\Delta\phi} + k_1 \cdot \overset{..}{\Delta\phi} + k_2 \Delta\dot{\phi} = k_5 \cdot \Delta\delta \qquad (I)$$

$$\overset{....}{\Delta y} + k_3 \cdot \overset{...}{\Delta y} + k_4 \Delta\ddot{y} = k_6 \cdot \Delta\delta \qquad (II)$$

$k_5$ and $k_6$ can be determined from steady-state cornering (where $\delta = 1/R$).

They are obtained from the following calculation $$\left. \begin{array}{l} k_2 \cdot \Delta\dot\phi = k_5 \cdot \Delta\delta, \; \Delta\dot\phi = \dfrac{k_5}{k_2} \cdot \Delta\delta \\ \text{and} \\ \Delta\dot\phi = \dfrac{V_x}{1} \cdot \Delta\delta \end{array} \right\} k_5 = k_2 \cdot \dfrac{V_x}{1}$$

$$\left. \begin{array}{l} k_4 \cdot \Delta\ddot{y} = k_6 \cdot \Delta\delta, \; \Delta\ddot{y} = \dfrac{k_6}{k_4} \cdot \Delta\delta \\ \text{and} \\ \Delta\ddot{y} = V_x \cdot \Delta\dot\phi = V_x \cdot \dfrac{V_x}{1} \cdot \Delta\delta = \dfrac{V_x^2}{1} \cdot \Delta\delta \end{array} \right\} k_6 = k_4 \cdot \dfrac{V_x^2}{1}$$

If the Ackermann condition $\delta = 1/R$ is made less severe, i.e. $\delta = k_a \cdot 1/R$, $k_a > 1$,) the following applies:

$$\overset{...}{\Delta\phi} + k_1 \cdot \overset{..}{\Delta\phi} + k_2 \cdot \Delta\dot\phi = \dfrac{k_2}{k_a} \cdot \dfrac{V_x}{1} \cdot \Delta\delta \qquad (I')$$

$$\overset{....}{\Delta y} + k_3 \cdot \overset{...}{\Delta y} + k_4 \cdot \Delta\ddot{y} = \dfrac{k_4}{k_a} \cdot \dfrac{V_x^2}{1} \cdot \Delta\delta \qquad (II')$$

The model is therewith established. The handling can be influenced via the parameters $k_1, \ldots, k_4, k_a$.

In the Ackermann diagram, the line $$\dfrac{\dot\phi}{\delta} = \dfrac{V_x}{k_a \cdot 1}$$

intersects the curves at their maximum when $k_a \approx 2$.

In order to effect the changes in $\dot\phi$ and $\ddot{y}$, changes must be introduced into the horizontal tire forces:

$$\Delta B_1 \text{ to } \Delta B_4, \; \Delta S_1 \text{ to } \Delta S_4$$

The following equations apply:

$$m \cdot \Delta\ddot{y} =$$

$$(\Delta S_1 + \Delta S_2) \cdot \cos\delta + (\Delta S_3 + \Delta S_4) - (\Delta B_1 + \Delta B_2) \cdot \sin\delta$$

$$I \cdot \Delta\ddot\phi = (\Delta S_1 + \Delta S_2) \cdot a \cdot \cos\delta - (\Delta S_3 + \Delta S_4) \cdot b +$$

$$(\Delta B_2 \cdot \cos\delta + \Delta B_4) \cdot d - (\Delta B_1 \cdot \cos\delta + \Delta B_3) \cdot d +$$

$$(\Delta S_2 - \Delta S_1) \cdot d \cdot \sin\delta - (\Delta B_1 + \Delta B_2) \cdot a \cdot \sin\delta$$

As a possible variation, there are the wheel brake-slip values of the four wheels. However, to ensure that as little braking retardation as possible is wasted, the slip values must be chosen so that $\Delta B_1 + \Delta B_2 + \Delta B_3 + \Delta B_4$ is approximately at its maximum, i.e. that the sum of the braking force reductions is at its minimum.

The values for $\Delta B_1 \ldots \Delta B_4$ can be calculated from the stability reserve, while $\Delta S_1 \ldots \Delta S_4$ can be calculated from the transverse stability reserve, it being possible to vary the stability reserves via the wheel brake slip.

For the purpose of further consideration, the above relations are transformed as follows:

$$m \cdot \Delta\ddot{y} = \left( \dfrac{\Delta S_1}{\Delta B_1} \cdot \cos\delta - \sin\delta \right) \cdot \Delta B_1 +$$

$$\left(\frac{\Delta S_2}{\Delta B_2} \cdot \cos\delta - \sin\delta\right) \cdot \Delta B_2 +$$

$$\left(\frac{\Delta S_3}{\Delta B_3} \cdot \Delta B_3\right) + \left(\frac{\Delta S_4}{\Delta B_4} \cdot \Delta B_4\right)$$

$$I \cdot \Delta\ddot{\phi} = \left\{\frac{\Delta S_1}{\Delta B_1} \cdot (a \cdot \cos\delta - d \cdot \sin\delta) - (d \cdot \cos\delta + a \cdot \sin\delta)\right\} \cdot \Delta B_1 +$$

$$\left\{\frac{\Delta S_2}{\Delta B_2} \cdot (a \cdot \cos\delta + d \cdot \sin\delta) + (d \cdot \cos\delta - a \cdot \sin\delta)\right\} \cdot \Delta B_2 + \left\{\frac{\Delta S_3}{\Delta B_3} \cdot (-b) + (-d)\right\} \cdot \Delta B_3 +$$

$$\left\{\frac{\Delta S_4}{\Delta B_4} \cdot (-b) + (d)\right\} \cdot \Delta B_4$$

$$m \cdot \Delta\ddot{x} = \left(\cos\delta + \frac{\Delta S_1}{\Delta B_1} \cdot \sin\delta\right) \cdot \Delta B_1 + \left(\cos\delta + \frac{\Delta S_2}{\Delta B_2} \cdot \sin\delta\right) \cdot \Delta B_2 + \Delta B_3 + \Delta B_4$$

$\Delta\ddot{y}$ can be varied by changes in $\Delta B_1 \ldots \Delta B_4$. The same applies to $\Delta\ddot{\phi}$ and $\Delta\ddot{x}$. Since the sum of the $\Delta B_i$ should be kept as small as possible, it is right to change only the $B_i$ with the largest coefficient. It is also the case that the $\Delta B_i$ do not make an equal contribution to the vehicle retardation. In order to judge which coefficient in the first two relations given above is largest, allowing for the requirement that $|\Delta\ddot{x}|$ should be kept to a minimum, the coefficients of the first two relations should be divided by the corresponding coefficient of the third relation. This corresponds to a weighting of the coefficients for the optimization of the braking retardation.

Since the coefficients vary with time and change continuously relative to one another due to the controller correction, it is advisable to alter all the $\Delta B_i$ but only to the extent that this corresponds to their weighted coefficients.

Transformation gives:

$$\Delta B_1 = C_1 \left\{\frac{\frac{\Delta S_1}{\Delta B_1} \cdot \cos\delta - \sin\delta}{\cos\delta + \frac{\Delta S_1}{\Delta B_1} \cdot \sin\delta} \cdot (\Delta\ddot{y} - \Delta\ddot{y}_F)\right\} +$$

$$C_2 \left\{\frac{\frac{\Delta S_1}{\Delta B_1} \cdot (a \cdot \cos\delta - d \cdot \sin\delta) - (d \cdot \cos\delta + a \cdot \sin\delta)}{\cos\delta + \frac{\Delta S_1}{\Delta B_1} \cdot \sin\delta} \cdot (\Delta\dot{\phi} - \Delta\dot{\phi}_F)\right\}$$

$$\Delta B_2 = C_1 \left\{\frac{\frac{\Delta S_2}{\Delta B_2} \cdot \cos\delta - \sin\delta}{\cos\delta + \frac{\Delta S_2}{\Delta B_2} \cdot \sin\delta} \cdot (\Delta\ddot{y} - \Delta\ddot{y}_F)\right\} +$$

$$C_2 \left\{\frac{\frac{\Delta S_2}{\Delta B_2} \cdot (a \cdot \cos\delta + d \cdot \sin\delta) + (d \cdot \cos\delta - a \cdot \sin\delta)}{\cos\delta + \frac{\Delta S_2}{\Delta B_2} \cdot \sin\delta} \cdot (\Delta\dot{\phi} - \Delta\dot{\phi}_F)\right\}$$

$$\Delta B_3 = C_1 \cdot \frac{\Delta S_3}{\Delta B_3} \cdot (\Delta\ddot{y}_M - \Delta\ddot{y}_F) + C_2 \cdot \left\{\frac{\Delta S_3}{\Delta B_3} \cdot (-b) + (-d)\right\} \cdot (\Delta\dot{\phi} - \Delta\dot{\phi}_F)$$

$$\Delta B_4 = C_1 \cdot \frac{\Delta S_4}{\Delta B_4} \cdot (\Delta\ddot{y}_M - \Delta\ddot{y}_F) + C_2 \cdot \left\{\frac{\Delta S_4}{\Delta B_4} \cdot (-b) + d\right\} \cdot (\Delta\dot{\phi} - \Delta\dot{\phi}_F)$$

Since, in general, the slip curve does not rise monotonically, the relationship between $\Delta S_i$ and $\Delta B_i$ is not unambiguous. It is therefore better to consider the changes in $B_i$ and $S_i$ as a function of the control variables $\lambda_i$.

In general, the following applies:

$$\Delta B_i = \frac{\delta B_i}{\delta \lambda_i} \cdot \Delta\lambda_i + \frac{\delta B_i}{\delta y} \cdot \Delta\dot{Y} + \frac{\delta B_i}{\delta \phi} \cdot \Delta\dot{\phi} + \frac{\delta B_i}{\delta x} \cdot \Delta\dot{X},$$

$$\Delta S_i = \frac{\delta S_i}{\delta \lambda_i} \cdot \Delta\lambda_i + \frac{\delta S_i}{\delta Y} \cdot \Delta\dot{Y} + \frac{\delta S_i}{\delta \phi} \cdot \Delta\dot{\phi} + \frac{\delta S_i}{\delta X} \cdot \Delta\dot{X}.$$

further changes due to movement of the vehicle body and axle movement not being taken into account.

Since the change in the slip, $\Delta\lambda_i$, has a greater bandwidth than the other changes $\Delta\dot{Y}$, $\Delta\dot{\phi}$ and $\Delta\dot{X}$, these changes are neglected. These dynamic components can be allowed for at a later stage by the inclusion of D and I components in the controller.

The following thus remains:

$$\Delta B_i = \frac{\delta B_i}{\delta \lambda_i} \cdot \Delta\lambda_i$$

$$\Delta S_i = \frac{\delta S_i}{\delta \lambda_i} \cdot \Delta\lambda_i$$

$$i = 1 \ldots 4$$

Using these, it is then possible to set up equations for the changes in the desired slips at the wheels, thus for example:

$$\Delta\lambda_1 = C_1 \frac{\frac{\delta S_1/\delta\lambda_1}{\delta B_1/\delta\lambda_1} \cdot \cos\delta - \sin\delta}{\cos\delta + \frac{\delta S_1/\delta\lambda_1}{\delta B_1/\delta\lambda_1} \cdot \sin\delta} (\Delta\ddot{y} - \Delta\ddot{Y}_F) +$$

$$C_2 \frac{\frac{\delta S_1/\delta\lambda_1}{\delta B_1/\delta\lambda_1} \cdot (a \cdot \cos\delta - d \cdot \sin\delta) - (d \cdot \cos\delta + a \cdot \sin\delta)}{\cos\delta + \frac{\delta S_1/\delta\lambda_1}{\delta B_1/\delta\lambda_1} \cdot \sin\delta} \cdot (\Delta\dot{\phi} - \Delta\dot{\phi}_F)$$

The values $$\frac{\delta S_i}{\delta \lambda_i} \text{ and } \frac{\delta B_i}{\delta \lambda_i}$$

are obtained from stored tire characteristic diagrams or from models which simulate the tire characteristic diagrams or directly from measurements by changing the slip by $\Delta \lambda_i$, measuring the force changes $\Delta S_i$ and $\Delta B_i$ and setting $$\frac{\delta S_i}{\delta \lambda_i} \approx \frac{\Delta S_i}{\Delta \lambda_i} \text{ and } \frac{\delta B_i}{\delta \lambda_i} \approx \frac{\Delta B_i}{\Delta \lambda_i}$$

The following is finally obtained, in abridged notation:

$$\left. \begin{array}{l} \Delta\lambda_1 = C_1 \cdot P_{y1} \cdot (\Delta\ddot{y} - \Delta\ddot{y}_F) + C_2 \cdot P_{\phi1} \cdot (\Delta\dot{\phi} - \Delta\dot{\phi}_F) \\ \Delta\lambda_2 = C_1 \cdot P_{y2} \cdot (\Delta\ddot{y} - \Delta\ddot{y}_F) + C_2 \cdot P_{\phi2} \cdot (\Delta\dot{\phi} - \Delta\dot{\phi}_F) \\ \Delta\lambda_3 = C_1 \cdot P_{y3} \cdot (\Delta\ddot{y} - \Delta\ddot{y}_F) + C_2 \cdot P_{\phi3} \cdot (\Delta\dot{\phi} - \Delta\dot{\phi}_F) \\ \Delta\lambda_4 = C_1 \cdot P_{y4} \cdot (\Delta\ddot{y} - \Delta\ddot{y}_F) + C_2 \cdot P_{\phi4} \cdot (\Delta\dot{\phi} - \Delta\dot{\phi}_F) \end{array} \right\} \quad \text{III}$$

By the choice of values for the coefficients $C_1$ and $C_2$ it is possible to determine which is more important: control of the deviation of the transverse acceleration $(\Delta\ddot{y} - \Delta\ddot{y}_F)$ or control of the deviation of the yaw rate $(\Delta\dot{\phi} - \Delta\dot{\phi}_F)$.

To compensate for the neglect of the dynamic components $\Delta\ddot{Y}$ and $\Delta\ddot{\phi}$, the following is proposed.

Instead of processing the deviations alone, the processing of the differentials and integrals of the deviations can also be included. A PD or PI or PID controller is then obtained; e.g. the relation for $\Delta\lambda_1$ in the case of PID control is as follows:

$$\Delta\lambda_1 = C_1 \cdot P_{y1} \cdot$$

$$\left\{ K_1'(\Delta\ddot{y} - \Delta\ddot{y}_F) + K_2'(\Delta\dddot{y} - \Delta\dddot{y}_F) + K_3' \int_0^t (\Delta\ddot{y} - \Delta\ddot{y}_F) dt \right\} +$$

$$C_2 \cdot P_{\phi 1} \cdot$$

$$\left\{ K_4'(\Delta\dot{\phi} - \Delta\dot{\phi}_F) + K_5'(\Delta\ddot{\phi} - \Delta\ddot{\phi}_F) + K_6' \int_0^t (\Delta\dot{\phi} - \Delta\dot{\phi}_F) dt \right\}$$

BRIEF DESCRIPTION OF THE DRAWING

The objects, features and advantages of the present invention will now be illustrated in more detail by the following detailed description of a preferred embodiment of the invention, reference being made to the accompanying drawing in which.

DETAILED DESCRIPTION OF A PREFERRED EMBODIMENT

Figure 1:
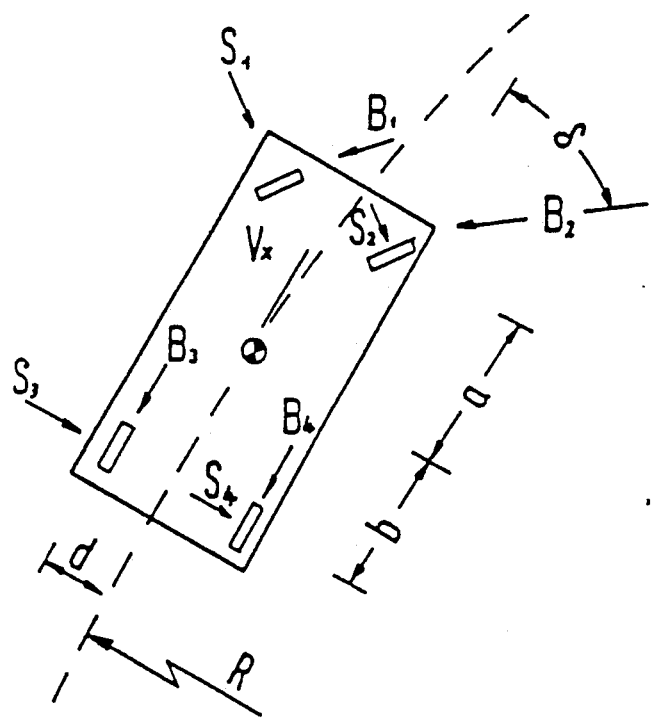
FIG. 1 is diagrammatic plan view of a motor vehicle having four tires illustrating the braking forces $B_i$ and cornering forces $S_i$ on the tires and the steering angle variable for the front tires.
Figure 2:
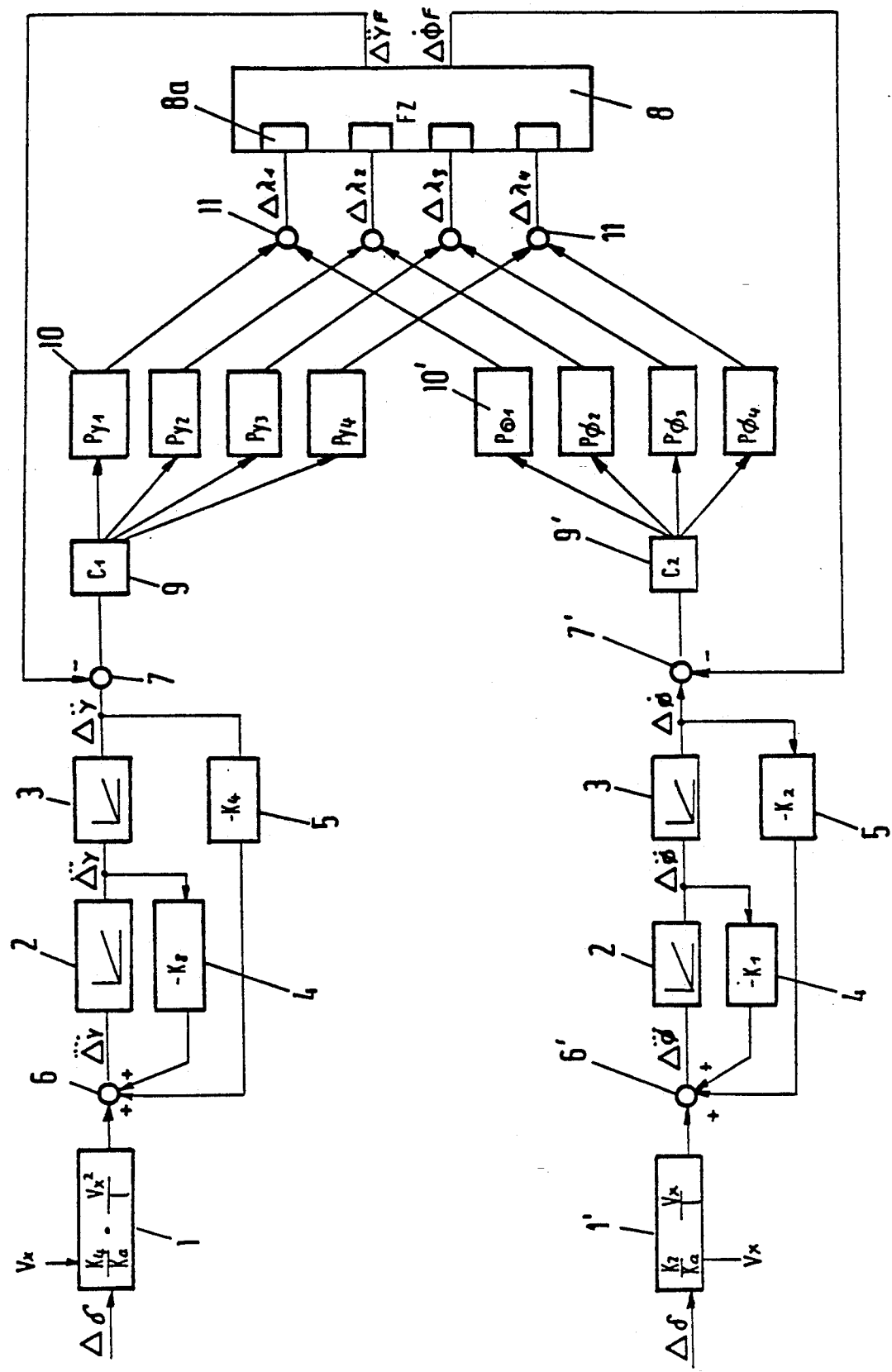
FIG. 2 is a flow chart of a preferred embodiment of the method of controlling vehicle dynamics according to the invention.

An illustrative embodiment of the invention is explained with reference to FIG. 2 of the drawing.

The brief changes in the steering angle $\Delta\delta$ and the longitudinal velocity $V_x$ of the vehicle performed from time to time are input into blocks 1 and 1' respectively and $\Delta\delta$ is there multiplied by $K_2 V_x / K_a l$ and $K_4 \cdot V_x^2 / K_a \cdot l$ respectively. By means of integrators 2, 3 and 2', 3' respectively, multipliers 4, 5 and 4', 5' respectively and adders 6 and 6' respectively, the quantities $\Delta\ddot{y}$ and $\Delta\dot{\phi}$ of the model are obtained at the output of the integrators 3 and 3'.

In comparators 7 and 7' respectively, the model quantities $\Delta\ddot{y}$ and $\Delta\dot{\phi}$ are compared to the corresponding quantities $\Delta\ddot{y}_F$ and $\Delta\dot{\phi}_F$ measured on the vehicle. The deviations $(\Delta\ddot{y} - \Delta\ddot{y}_F)$ and $(\Delta\dot{\phi} - \Delta\dot{\phi}_F)$ are provided in multipliers 9 and 9' respectively with weighting factors $c_1$ and $c_2$ respectively. Each half of the system then separates into four channels and the weighted deviations are multiplied in multipliers 10 and 10' respectively by factors $P_{yi}$ and $P_{\phi i}$ assigned to the individual wheels. Signals associated with the same wheel are then added in adders 11 and the desired changes of the slips $\Delta\lambda i$ of the individual wheels are obtained. These changes are passed to controllers 8a contained in the vehicle block 8 and these controllers alter the brake pressure in such a way that the currently prevailing brake slip $\lambda i$ is converted into a new brake slip $\lambda i + \Delta\lambda i$. For this purpose, the brake slip must, in a known manner, be determined and compared to the new desired brake slip $\Delta i + \Delta\lambda i$. The brake pressure variation is ended when the brake slip has come to equal the desired brake slip. If, instead of $\Delta\lambda i$, signals corresponding to the desired braking force changes $\Delta B i$ are to be produced and corresponding braking force changes are to be performed by the controllers, then, in FIG. 2, all that is required is to specify different factors $P'_{yi}$ and $P'_{\phi i}$ respectively in multipliers 10 and 10' respectively.

While the invention has been illustrated and described as embodied in a method of controlling vehicle dynamics, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A method of controlling brake slip at each of n tires of a vehicle during braking to control driving dynamics, said method comprising the steps of:
   a) making a small change $\Delta\delta$ in steering angle of the vehicle;
   b) performing a model calculation to obtain a calculated yaw rate $\Delta\dot{\delta}$ and a calculated transverse acceleration $\Delta\ddot{y}$ using the following model differential equations:

$$\Delta\ddot{\phi} + k_1 \Delta\ddot{\phi} + k_2 \Delta\dot{\phi} = k_5 \cdot \Delta\delta \quad \text{(I)}$$

$$\Delta\dddot{y} + k_3 \Delta\ddot{y} + k_4 \Delta\ddot{y} = k_6 \cdot \Delta\delta \quad \text{(II)}$$

wherein $k_1$ to $k_4$ are constants and $k_5$ and $k_6$ are quantities dependent on vehicle speed;
   c) measuring an actual yaw rate $\Delta\dot{\phi}_F$ and an actual transverse acceleration $\Delta\ddot{y}_F$;

d) comparing the actual yaw rate and calculated yaw rate and determining a deviation of the calculated yaw rate from the actual yaw rate $\Delta\dot\phi - \Delta\dot\phi_F$;

e) comparing the actual transverse acceleration and the calculated transverse acceleration and determining a deviation of the calculated transverse acceleration from the actual transverse acceleration $\Delta\ddot{y} - \Delta\ddot{y}_F$;

f) calculating changes in brake slip, $\Delta\lambda_i$, at each of the n tires of the vehicle from quantities $P_{\phi i}$ and $P_{yi}$ dependent on braking forces $B_i$ and cornering forces $S_i$ and the steering angle $\delta$, and from the deviation of the calculated yaw rate from the actual yaw rate determined in step d) and the deviation of the calculated transverse acceleration from the actual transverse acceleration determined in step e) using the following equation:

$$\Delta\lambda_i = C_1 P_{yi}(\Delta\ddot{Y} - \Delta\ddot{Y}_F) + C_2 P_{\phi i}(\Delta\dot\phi - \Delta\dot\phi_F) \qquad (III)$$

wherein $c_1$ and $c_2$ are predetermined weighting factors for changes in the transverse acceleration and the yaw rate, wherein i designates one of the n tires; and g) changing brake pressures at each tire according to the brake slip changes calculated in step f).

2. A method according to claim 1, wherein in step f) the calculated brake slip has differential (PD) and integral components (PI,PID).

3. A method for controlling braking forces at each of n tires of a vehicle during braking to control driving dynamics, said method comprising the steps of:

a) making a small change $\Delta\delta$ in steering angle of the vehicle;

b) performing a model calculation to obtain a calculated yaw rate $\Delta\dot\phi$ and a calculated transverse acceleration $\Delta\ddot{Y}$ using the following model differential equations:

$$\Delta\dddot\phi + k_1\Delta\ddot\phi + k_2\Delta\dot\phi = k_5 \cdot \Delta\delta \qquad (I)$$

$$\Delta\dddot{y} + k_3\Delta\ddot{y} + k_4\Delta\dot{y} = k_6 \cdot \Delta\delta \qquad (II)$$

wherein $k_1$ to $k_4$ are constants and $k_5$ and $k_6$ are quantities dependent on vehicle speed;

c) measuring an actual yaw rate $\Delta\dot\phi_F$ and an actual transverse acceleration $\Delta\ddot{Y}_F$;

d) comparing the actual yaw rate and calculated yaw rate and determining a deviation of the calculated yaw rate from the actual yaw rate $\Delta\dot\phi - \Delta\dot\phi$;

e) comparing the actual transverse acceleration and the calculated transverse acceleration and determining a deviation of the calculated transverse acceleration from the actual transverse acceleration $\Delta\ddot{Y} - \Delta\ddot{Y}_F$;

f) calculating changes in braking forces, $\Delta B_i$, at each of the n tires of the vehicle from quantities $P_{\phi i}'$ and $P_{yi}'$ dependent on braking forces $B_i$ and cornering forces $S_i$ and the steering angle $\delta$, and from the deviation of the calculated yaw rate from the actual yaw rate determined in step d) and the deviation of the calculated transverse acceleration from the actual transverse acceleration determined in step e) using the following equation:

$$\Delta B_i = C_2 P_{yi}'(\Delta\ddot{Y} - \Delta\ddot{Y}_F) + C_2 P_{\phi i}'(\Delta\dot\phi - \Delta\dot\phi_F) \qquad (IV)$$

wherein i designates one of the n tires; and wherein $c_1$ and $c_2$ are predetermined weighting factors for changes in the transverse acceleration and the yaw rate, g) changing brake pressures at each tire according to the braking force changes calculated in step f).

4. A method according to claim 3, wherein in step f) the braking forces have differential (PD) and integral components (PI,PID).

* * * * *